United States Patent [19]
Matsuda

[11] Patent Number: 5,477,363
[45] Date of Patent: Dec. 19, 1995

[54] OPTICAL SWITCHING DEVICE

[75] Inventor: Manabu Matsuda, Kawasaki, Japan

[73] Assignee: Fujitsu Limited, Kawasaki, Japan

[21] Appl. No.: 404,674

[22] Filed: Mar. 15, 1995

[30] Foreign Application Priority Data

Mar. 16, 1994 [JP] Japan ................... 6-046190

[51] Int. Cl.$^6$ ................... H04J 14/02
[52] U.S. Cl. ................... 359/128; 359/133; 385/14; 385/24
[58] Field of Search ................... 359/117, 128, 359/130, 133, 139; 385/14, 18, 24

[56] References Cited

U.S. PATENT DOCUMENTS

| | | | |
|---|---|---|---|
| 4,773,063 | 9/1988 | Hensperger et al. | 359/130 |
| 5,414,548 | 5/1995 | Tachikawa et al. | 359/130 |

FOREIGN PATENT DOCUMENTS

| | | |
|---|---|---|
| 0166291 | 2/1986 | European Pat. Off. . |
| 0497358 | 5/1992 | European Pat. Off. . |

OTHER PUBLICATIONS

M. Fallahi et al., 1993 IEEE, "Grating Demultiplexer Integrated with MSM Detector Array in InGaAs/AlGaAs/GaAs for WDM", pp. 794–797.

*Patent Abstract of Japan* vol. 12, No. 217 (E-624) 21 Jun. 1988 & JP-A-63-013 492 (NEC).

*Patent Abstract of Japan* vol. 17, No. 448 (P-1594) 17 Aug. 1993 U JP-A-05 100 255 (NIT).

*Primary Examiner*—Leo H. Boudreau
*Assistant Examiner*—Kinfe-Michael Negash
*Attorney, Agent, or Firm*—Armstrong, Westerman, Hattori, McLeland, & Naughton

[57] ABSTRACT

An optical switching device includes a transparent optical waveguide, a plurality of light emitting elements provided on the optical waveguide for producing wavelength-multiplex optical signals, a plurality of diffraction gratings provided on the optical waveguide in correspondence to the light emitting elements for causing a diffraction of the wavelength-multiplex optical signals supplied thereto, and a plurality of photodetection elements provided on the optical waveguide in correspondence to the paths of the optical beams diffracted by the diffraction gratings, wherein the pitch of the diffraction gratings is optimized with respect to the position of the photodetection elements such that optical signal components having the same wavelength reach the same photodetection elements from the plurality of diffraction gratings.

15 Claims, 16 Drawing Sheets

OPTICAL SWITCHING DEVICE

BACKGROUND OF THE INVENTION

The present invention generally relates to optical telecommunications and more particularly to an optical switching device that switches wavelength-multiplexed optical signals between a plurality of optical input ports and a plurality of optical output ports.

With the development of optical telecommunications, there is a demand for an optical switching device that carries out the switching of a wavelength-multiplexed signal between a plurality of input optical fibers and a plurality of output optical fibers. In such an optical switching device for switching wavelength-multiplexed signals, each of the input optical fibers carries a wavelength-multiplexed signal containing therein a plurality of optical signal components having respective wavelengths, while each of the output optical fibers are provided in correspondence to one of the wavelengths forming a channel of the wavelength-multiplexed signal. Such an optical switching of the wavelength-multiplexed signals is not only useful in the optical telecommunications but also in parallel processing computers wherein a plurality of processors are connected with each other by a common optical bus for exchanging data in the form of optical signals.

In the conventional art of optical switching, it has been practiced to convert optical signals once to electric signals, such that the desired switching of the optical signals is made in a digital switching device by switching the electric signals thus obtained. After switching, the electric signals are converted back to optical signals. Such a construction is naturally complex and has a drawback in that a very large scale digital switching device has to be provided.

On the other hand, there is a proposal to construct an optical switching device that carries out a switching of the optical signals without converting the same to electric signals. For example, Fallahi, et al. proposed an optical switching device in which a plurality of optical fibers are coupled to a diffraction grating, which acts as a spectroscope, by a number of optical couplers (Fallahi, M. et al., IEEE Photonics Technology Letters, vol. 15, no. 7, July, 1993, pp. 794–797). However, the foregoing optical switching device requires a large number of optical fibers cascaded by Y-shaped optical couplers for multiplexing the optical signals and thus has a drawback in that the construction of the switching device becomes very large and extensive when there are a large number of channels in the wavelength-multiplex optical signal.

FIG. 1 shows the construction of a conventional optical switching device that uses an optical waveguide.

Referring to FIG. 1, the optical switching device cooperates with a plurality of processing units #1–#k each including a plurality of processing elements PE#1–PE#n, wherein each of the processing elements PE#1–PE#n receives and outputs an electrical signal via a line that forms a cable collectively designated by a numeral 10. Thus, in the illustrated example, a cable 10 is provided in correspondence to each of the processing units #1–#k, wherein each line in the cable 10 is connected to an electro-optical conversion interface I/F for converting the electric signal in the line 10 to an optical signal. The optical signal thus produced is then supplied to an optical fiber collectively designated by a numeral 11. Further, the optical signal supplied to the interface I/F via the optical fiber 11 is supplied to a corresponding processing unit after conversion to an electric signal in the interface unit I/F. Thereby, it should be noted that each of the interfaces I/F receives electric signals from a plurality of processing units and produce a wavelength-multiplex optical signal in which the foregoing electric signals are multiplexed with respective, different wavelengths. The wavelength-multiplex optical signal thus produced is then outputted to the optical fiber 11. Further, the interface I/F separates the individual electric signals by carrying out a demultiplexing of the wavelength-multiplex optical signal supplied thereto from the optical fiber 11.

The wavelength-multiplex optical signal thus produced is then injected to a glass slab 12 that provides an optical waveguide. In the illustrated example, the glass slab 12 is provided in a plural number in correspondence to the processing elements #1–#n, wherein each optical waveguide 12 carries a plurality of ports $l_1, l_2, \ldots l_k$ for connection of the foregoing optical fibers. Thus, the waveguide 12 is injected with a plurality of wavelength-multiplex optical signals at the foregoing ports $l_1$–$l_k$, wherein the optical signals thus injected propagate through the waveguide 12 by repeatedly causing reflections therein. Further, the optical signals thus propagated through the waveguide 12 are outputted to the optical fiber(s) 11 via one or more of the foregoing ports $l_1$–$l_k$.

In such a so-called broadcast type waveguide, there occurs a diffusion in the optical signals propagating therethrough. Thus, there arises a problem in that the intensity or reception level of the optical signals decreases at the foregoing input/output ports. When such a decrease occurs in the reception level of the optical signals, the S/N ratio of the optical switching is deteriorated inevitably. Further, such a broadcast type waveguide lacks selectivity of wavelengths, and because of this, it is necessary to provide a mechanism in the interface unit I/F for separating an optical signal of desired channel from the wavelength-multiplex optical signals. While such a separation of particular signal components from a wavelength multiplex signal may be achieved by using a multilayer filter that selects a particular wavelength as a result of Bragg diffraction, it should be noted that such a multilayer filter is not suitable for use in the broadcast type waveguide, as the optical signals arrive at the input/output ports in such a broadcast type waveguide with various angles of incidence that range from 0° to 90°.

It is also possible to separate a wavelength-multiplex optical signal into a plurality of optical signal components by providing a diffraction grating at an end of a single ridge waveguide that guides the wavelength-multiplex signal therethrough, such that the optical signal components thus separated travel through respective optical waveguides as proposed by Fallahi, M., op. cit. Such a construction, however, has a drawback noted previously in that it is necessary to cascade a large number of optical couplers in order to inject optical signals into the ridge waveguide to produce a wavelength-multiplex optical signal therein. Further, such an approach is difficult to be adopted in constructing a multiple bit optical switching device in which a plurality of wavelength-multiplex signals corresponding to multiple bit data are processed by respective ridge waveguides that are stacked with each other in correspondence to each bit.

Meanwhile, there is an optical bus of ultra-high speed computers that has a function similar to the optical switching device under consideration.

FIG. 2 shows the construction of such an optical bus proposed previously.

Referring to FIG. 2, the optical bus is constructed from an optical waveguide 21 having substantially parallel upper and lower major surfaces, wherein the waveguide 21 supports thereon a substrate 22 that in turn carries a plurality of parallel processors 23. The substrate 22 further carries light emitting elements 23a and photodetection elements 23b in correspondence to the plurality of processors 23, wherein each of the light emitting elements 23a injects the output of the processor 23 into the optical waveguide 21 in the form of optical signal. The optical signal thus injected is guided through the optical waveguide 21 by causing a multiple reflection between the upper and lower major surfaces and is detected by the foregoing photodetection element(s) 23b. In order to facilitate the injection as well as the detection of the optical signals, the optical waveguide 21 is provided with microlenses 21a in correspondence to the light emitting devices 23a and the photodetection devices 23b.

Thus, it will be noted that the optical waveguide 21 of FIG. 2 falls in the category of the broadcasting type waveguide and cannot avoid the problem of diffusion of the optical signals in the optical waveguide as well as the problem of decrease of the reception signal level associated with such a diffusion. Further, such a construction has a drawback in that it is difficult to provide wavelength selection function to the photoreception device.

SUMMARY OF THE INVENTION

Accordingly, it is a general object of the present invention to provide a novel and useful optical switching device wherein the foregoing problems are eliminated.

Another and more specific object of the present invention is to provide an optical switching device having an optical waveguide supplied with a plurality of wavelength-multiplex optical signals for guiding each optical signal component forming the wavelength-multiplex optical signal along a ray path that is pertinent to the optical signal component, and a plurality of photodetection elements provided on the optical waveguide in correspondence to each of the ray paths of the optical signal components, such that the switching of the wavelength-multiplex optical signals is made as a result of switching of the optical signal components forming the wavelength-multiplex optical signals.

Another object of the present invention is to provide an optical switching device having a plurality of input ports for receiving a plurality of wavelength-multiplex optical signals, said optical switching device separating each of said plurality of wavelength-multiplex optical signals into a plurality of optical signal components each having a wavelength corresponding to a channel of the wavelength-multiplex signals, such that each of said plurality of optical signal components is directed to a corresponding one of a plurality of output ports provided in correspondence to the wavelengths of the optical signal components forming said wavelength-multiplex signals, said optical switching device comprising:

an optical waveguide formed of an optically transparent medium;

a plurality of light emitting elements provided on said optical waveguide as said plurality of input ports, each of said light emitting elements producing a wavelength multiplex optical signal that includes therein a plurality of optical signal components having respective, mutually different wavelengths and injecting said wavelength-multiplex optical signal into said optical waveguide along a ray path that is pertinent to said wavelength-multiplex optical signal;

a plurality of photodetection elements provided on said optical waveguide at respective positions that are offset from said plurality of light emitting elements as said output ports, said positions of said photodetection elements corresponding to the wavelengths of said optical signal components forming said wavelength-multiplex optical signals, each of said photodetection elements detecting a signal component that-propagates through said optical waveguide and has a wavelength corresponding to the position of said photodetection element; and a plurality of diffraction gratings each provided on said optical waveguide in correspondence to a ray path of a light emitting element included in said plurality of light emitting elements, for separating a wavelength-multiplex signal incident thereto along said ray path, into a plurality of optical signal components constituting said wavelength-multiplex signal, said diffraction grating causing a diffraction of said plurality of optical signal components thus separated to respective, corresponding photodetection elements that are included in said plurality of photodetection elements;

wherein each of said plurality of diffraction gratings has a position on said optical waveguide and a grating pitch, such that said position and grating pitch are different from those of other diffraction gratings.

According to the present invention, it is possible to demultiplex the incident wavelength-multiplex optical signals into respective optical signal components by means of the diffraction gratings that are provided on the optical waveguide at respective positions with respective grating pitches. Thereby, the optical signal components thus demultiplexed are directed to respective photodetection elements that are provided on the optical waveguide at respective positions corresponding to the wavelengths of the optical signal components constituting the wavelength-multiplex optical signals. In the optical switching device of such a construction, the diffraction gratings produce the diffraction beams in the form of sharply defined optical beam and it is possible to maximize the S/N ratio of optical switching by providing the photodetection elements at optimum positions optimized with respect to the diffraction beams from the diffraction gratings. Further, it is possible to suppress the cross-talk between the optical signal components of adjacent wavelength channels by providing a multilayer filter to each of the photodetection elements. As the plurality of diffraction gratings are provided on the optical waveguide at respective, mutually different positions, the problem of cross talk does not occur even when an optical signal component impinges upon a diffraction grating from a light emitting element that is different from the light emitting element that corresponds to the diffraction grating under consideration. It should be noted that such a "stray optical beam" has an angle of incidence, with respect to the diffraction grating under consideration, which is different from the angle of incidence of the "proper" optical beam that is incident to the diffraction grating from a proper light emitting element that corresponds to the diffraction grating. Thus, the stray optical beam is diffracted with a diffraction angle substantially different from the diffraction angle of the proper optical beam and does not hit the photodetection element. Further, it is possible to reduce the diffusion of the optical beam emitted from the light emitting elements further by providing a microlens in correspondence to each of the light emitting elements. Thereby, the effect of cross-talk caused by such a stray optical beam is minimized.

In the optical switching device of such a construction, it should further be noted that each of the incoming wavelength-multiplex optical signals hits a corresponding diffraction grating after traveling along a ray path pertinent thereto, and it is no longer necessary to provide an optical input unit having a cascaded construction of optical couplers in order to inject optical signals into a single optical waveguide such as an optical fiber or a ridge type optical waveguide. Thus, the optical switching device of the present invention has a compact size.

It is possible to use various media such as a glass slab, a semiconductor substrate or a plastic slab for the optical waveguide. In a typical construction, a semiconductor substrate carrying thereon the light emitting elements and the photodetection elements is prepared and such a semiconductor substrate is provided upon a first principal surface of the slab that acts as the optical waveguide. By providing a sawtooth surface on a second, opposing principal surface of the slab, with a pitch of the saw teeth corresponding to the pitch of the light emitting elements on the substrate, it is possible to cause a diffraction of the incident wavelength-multiplex optical signals as described. In such a construction, it should be noted that each of the saw teeth carries a diffraction grating with a grating pitch different in each saw tooth. Alternatively, such a slab may carry a single oblique principal surface inclined with respect to the foregoing first principal surface. In this case, a number of diffraction gratings are provided on such an oblique principal surface in correspondence to the light emitting elements such that each diffraction grating has a grating pitch pertinent thereto. Such a construction is simple and can be fabricated easily. Further, it is possible to construct the optical switching device such that the light emitting elements and photodetection elements are arranged on the optical waveguide to form a number of layers. Thereby, it is possible to switch each bit of a multiple bit optical signal simultaneously.

Other objects and further features of the present invention will become apparent from the following detailed description when read in conjunction with the attached drawings.

DETAILED DESCRIPTION OF PREFERRED EMBODIMENTS

Figure 3:
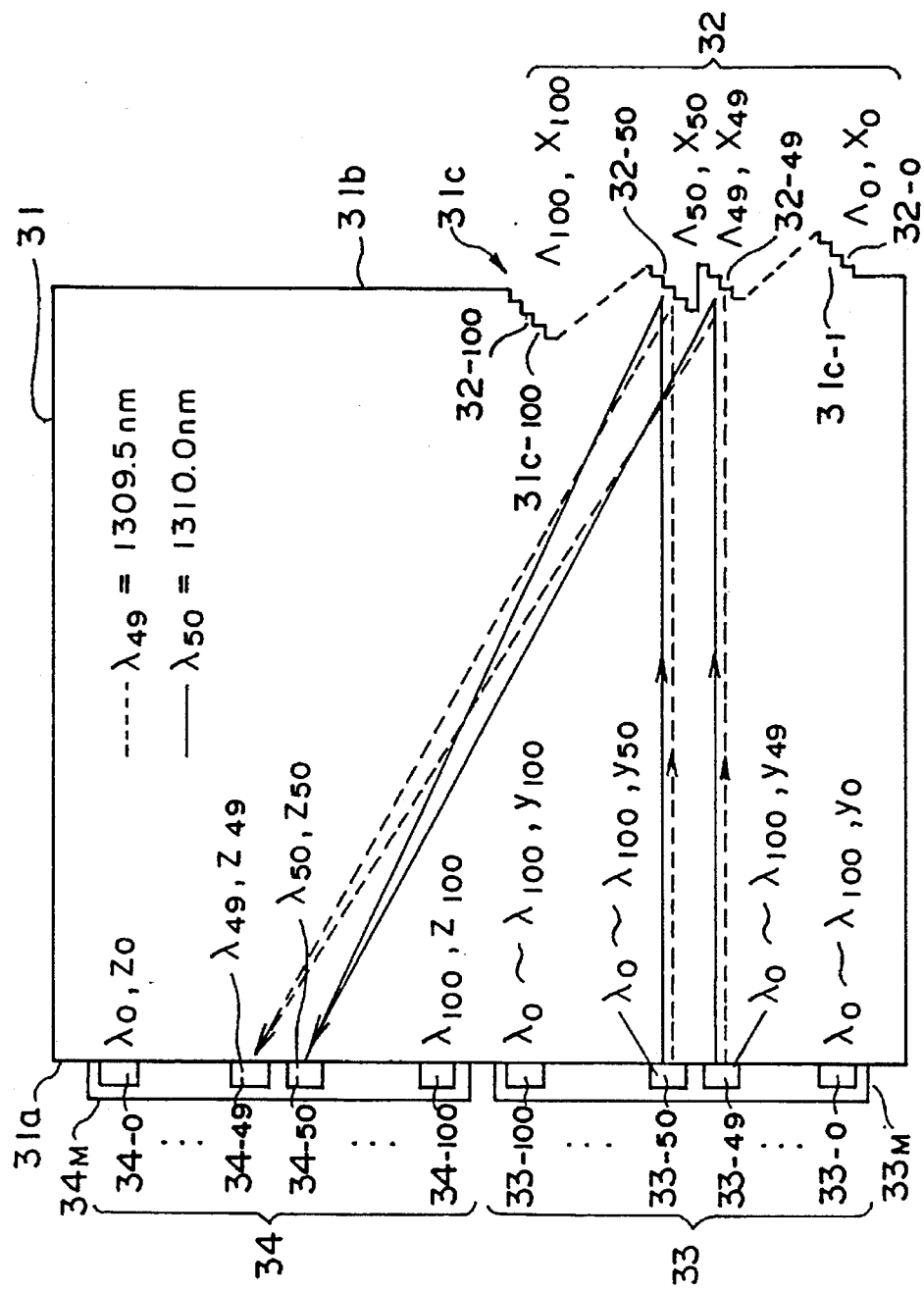
FIG. 3 is a diagram showing the construction of an optical switching device according to a first embodiment of the present invention.

FIG. 3 shows the construction of an optical switching device according to a first embodiment of the present invention.

Referring to FIG. 3, the optical switching device is constructed on a slab 31 of a transparent medium such as glass, wherein the slab 31 has a first edge surface 31a on which a laser diode array 33 including a plurality of laser diodes $33_0$–$33_{100}$ and a photodiode array 34 including a plurality of photodiodes $34_0$–$34_{100}$ are provided. In the illustrated example, it should be noted that the laser diode array 33 includes 101 laser diodes $33_0$–$33_{100}$ disposed on the edge surface 31a at respective positions $y_0$–$y_{100}$ with a mutual separation of 100 μm. Thereby, each of the laser diodes $33_0$–$33_{100}$ produces a wavelength-multiplexed optical signal containing therein optical signal components having respective wavelengths $\lambda_0$–$\lambda_{100}$ that are set in a range of 1285 nm–1335 nm with a mutual wavelength separation of 0.5 nm. The wavelength-multiplexed optical signals thus produced are emitted to the optical waveguide from the laser diodes $33_0$–$33_{100}$ along respective ray paths. In the illustrated example, the laser diodes $33_0$–$33_{100}$ are provided on a common semiconductor substrate $33_M$, which in turn is bonded upon the foregoing edge surface 31a of the slab 31 by means of adhesive. One may use a simple glass slab or transparent plastic plate for the slab 31. Alternatively, it is possible to use a construction in which a core layer of high refractive glass is sandwiched by a pair of glass clads having a lower refractive index such that there occurs an optical confinement in the core layer.

In the illustrated optical switching device, it should be noted that the slab 31 has a second edge surface 31b at an opposite side of the edge surface 31a, wherein the edge surface 31b carries thereon a number of toothed regions $31c_1$–$31c_{100}$ provided with a pitch of 100 μm in correspondence to the laser diodes $33_0$–$33_{100}$ included in the laser diode array 33. In FIG. 3, the toothed regions $31c_1$–$31c_{100}$ collectively form a toothed region 31c. It should be noted that the toothed regions $31c_1$–$31c_{100}$ are provided on the edge surface $31b$ at respective positions $x_0$–$x_{100}$ corresponding to the positions $y_0$–$y_{100}$ such that each of the laser beams emitted from the laser diodes $33_0$–$33_{100}$ hits a corresponding sawtooth region included in the foregoing regions $31c_1$–$31c_{100}$. Further, each of the sawtooth regions $31c_0$–$31c_{100}$ carries corresponding diffraction grating $32_0$–$32_{100}$. Thus, the diffraction gratings $32_0$–$32_{100}$ cause a diffraction in the optical beams that are incident to the sawtooth regions $31c_0$–$31c_{100}$. As a result of such a diffraction, each of the wavelength-multiplex optical signals incoming from the laser diodes $33_0$–$33_{100}$ is decomposed or demultiplexed to respective optical signal components, wherein each of the diffraction gratings $32_0$–$32_{100}$ diffracts such optical signal components to respective directions corresponding to the wavelength of the demultiplexed optical signals.

Here, it should be noted that the diffraction gratings $32_0$–$32_{100}$ have respective grating pitches $\underline{\Lambda}_0$–$\underline{\Lambda}_{100}$ that are different from each other, wherein the grating pitches $\underline{\Lambda}_0$–$\underline{\Lambda}_{100}$ are so determined that the optical signal components, diffracted by the diffraction gratings $32_0$–$32_{100}$ and having the same wavelength, are converged at a predetermined point on the edge surface $31a$ of the slab $31$ that is determined by the wavelength of the foregoing optical signal components. For example, an optical signal component of the wavelength-multiplex optical signal emitted from a laser diode $33_{49}$ and having a wavelength $\lambda_{50}$ (=1310.0 nm) hits a point $z_{50}$ on the edge surface $31a$ of the optical waveguide $31$ along a ray path indicated by a continuous line in FIG. 3, after experiencing a diffraction at the diffraction grating $32_{49}$ that has a grating pitch of $\lambda_{49}$. Similarly, an optical signal component of the wavelength-multiplex optical signal emitted by a laser diode $33_{50}$ and having the same wavelength $\lambda_{50}$ hits the same point $z_{50}$ on the edge surface $31a$ along a different ray path shown also in FIG. 3 by another continuous line, after experiencing a diffraction at the diffraction grating $32_{50}$ that has a grating pitch of $\underline{\Lambda}_{50}$. On the other hand, an optical signal component of the wavelength-multiplex optical signal having a wavelength $\lambda_{49}$ (=1309.5 nm) and emitted from the laser diode $33_{49}$, experiences a diffraction at a diffraction grating $32_{49}$ and reaches a position $z_{49}$ defined on the edge surface $31a$ along a ray path shown in FIG. 3 by a broken line. Similarly, an optical signal component of the wavelength-multiplex optical signal having the same wavelength $\lambda_{49}$ but emitted from the laser diode $33_{50}$, experiences a diffraction at the diffraction grating $32_{50}$ and reaches the foregoing position $z_{49}$ on the edge surface $31a$ of the optical waveguide $31$ along a ray path shown in FIG. 3 by another broken line. It should be noted that the edge surface $31a$ carries thereon the foregoing photodiodes $34_0$–$34_{100}$ at respective positions $z_0$–$z_{100}$ that include the foregoing positions $z_{49}$ and $z_{50}$, wherein the photodiodes $34_0$–$34_{100}$ detect the optical signals at wavelengths $\lambda_0$–$\lambda_{100}$ respectively. In other words, the foregoing photodiodes $34_0$–$34_{100}$ are provided in correspondence to the wavelengths $\lambda_0$–$\lambda_{100}$ that constitute the wavelength channels of the wavelength-multiplex signal.

The following TABLE I shows an example of the relationship between the positions $y_0$–$y_{100}$ of the laser diodes $33_0$–$33_{100}$, the positions $x_0$–$x_{100}$ and the corresponding grating pitches $\underline{\Lambda}_0$–$\underline{\Lambda}_{100}$ of the diffraction gratings $32_0$–$32_{100}$, and the positions $z_0$–$z_{100}$ of the photodiodes $34_0$–$34_{100}$. In the example of TABLE I, it should be noted that the diffraction gratings are formed with a precision of 0.1 nm for the grating pitches $\underline{\Lambda}_0$–$\underline{\Lambda}_{100}$ and with a precision of 0.1 mm for the positions $x_0$–$x_{100}$, in view of accuracy of machining the slab that forms the optical waveguide.

TABLE I

| LD#y(mm) | x(mm) | $\Lambda$(nm) | PD# | z(mm) |
| --- | --- | --- | --- | --- |
| #00.0 | 178.2 | 695.8 | #0 | 54.5455 |
| . | . | . | . | . |
| #494.9 | 175.2 | 685.1 | #49 | 49.6113 |
| #505.0 | 175.0 | 685.0 | #50 | 49.5105 |
| . | . | . | . | . |
| #10010.0 | 171.7 | 674.2 | #100 | 44.4637 |

Figure 4:
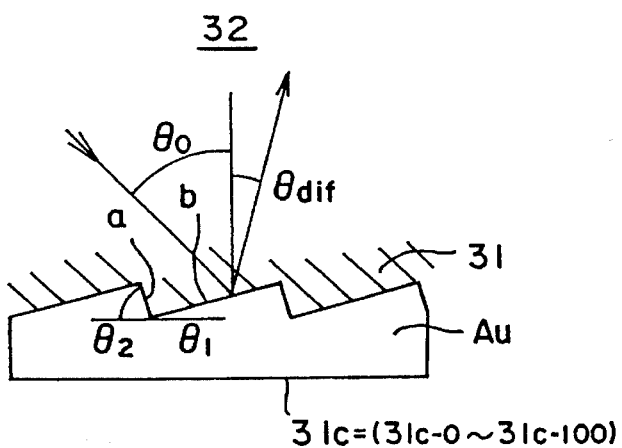
FIG. 4 is a diagram showing the diffraction caused by a diffraction grating provided on the optical switching device of FIG. 3.

FIG. 4 shows a part of the diffraction grating of FIG. 3 in an enlarged scale. It should be noted that the diffraction grating of FIG. 4 may be any of the diffraction gratings $32c_0$–$32c_{100}$ of FIG. 3 and is designated by a generalized reference numeral of $32$.

Referring to FIG. 4, the diffraction grating $32$ is formed on a slope $31c$ that may be any one of the sawtooth regions $31c_0$–$31c_{100}$, wherein the diffraction grating $32$ is formed thereon as an echelle defined by a repetition of a slope $a$ having an angle $\Theta_1$ and another slope $b$ having an angle $\Theta_2$. In the illustrated example, the angle $\Theta_1$ is set to 12° while the angle $\Theta_2$ is set to 28°. In order to improve the reflectance, the diffraction grating is covered by an Au coating not illustrated.

In the construction of FIG. 4, it should be noted that the slope $31c$ that carries the diffraction grating $32$ intersects with the optical beams emitted from the laser diodes $33_0$–$33_{100}$ obliquely. Thus, the optical beam emitted from the laser diode corresponding to the sawtooth region $31c$ and carrying a wavelength-multiplex optical signal thereon impinges upon the diffraction grating $32$ with a predetermined incidence angle $\Theta_0$, wherein the optical beam thus incident upon the diffraction grating $32$ experiences a diffraction with a predetermined diffraction angle $\Theta_{diff}$ that is determined by the incidence angle $\Theta_0$, the wavelength $\lambda$ of the optical signal component in the wavelength-multiplex optical signal and the pitch $\underline{\Lambda}$ of the diffraction grating. In the illustrated example, the slab $31$ has a refractive index $n_0$ of 1.57 and the optical beam impinges upon the diffraction grating $32$ with an incidence angle $\Theta_0$ of 45°. In other words, each of the sawtooth regions $31c_0$–$31c_{100}$ provides a slope on which the diffraction grating is formed, such that the slope forms an angle of 45° with respect to the ray path of the optical beam incident thereto from the corresponding laser diode.

Figure 5:
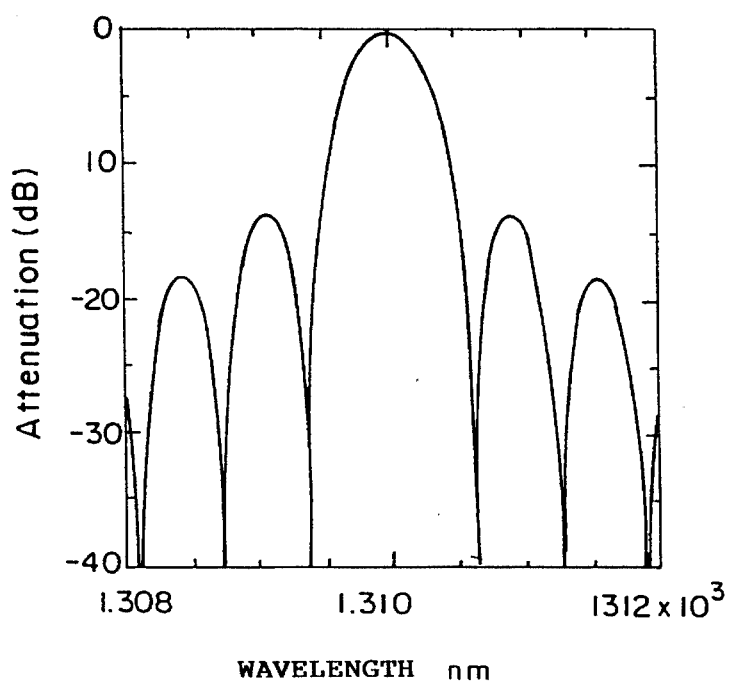
FIG. 5 is a diagram showing the wavelength-dispersion of the diffraction grating of FIG. 4.

FIG. 5 shows the wavelength-dispersion of the optical signal components separated by such a diffraction grating, wherein the illustrated example shows the intensity distribution of the optical signal components that are detected by the photodiode $34_{50}$. It should be noted that the photodiode $34_{50}$ is disposed so as to detect the diffraction beam having the wavelength $\lambda_{50}$ of 1310 nm. As will be noted from FIG. 5, one can obtain a selectivity of about 10 dB for the optical signal component having the foregoing wavelength of $\lambda_{50}$ with respect to the optical signal component of which wavelength is offset with respect to the wavelength $\lambda_{50}$ by 5 nm such as the optical signal component having a wavelength $\lambda_{49}$ (=1309.5 nm) or the optical signal component having a wavelength $\lambda_{51}$ (=1310.5 nm).

Figure 6:
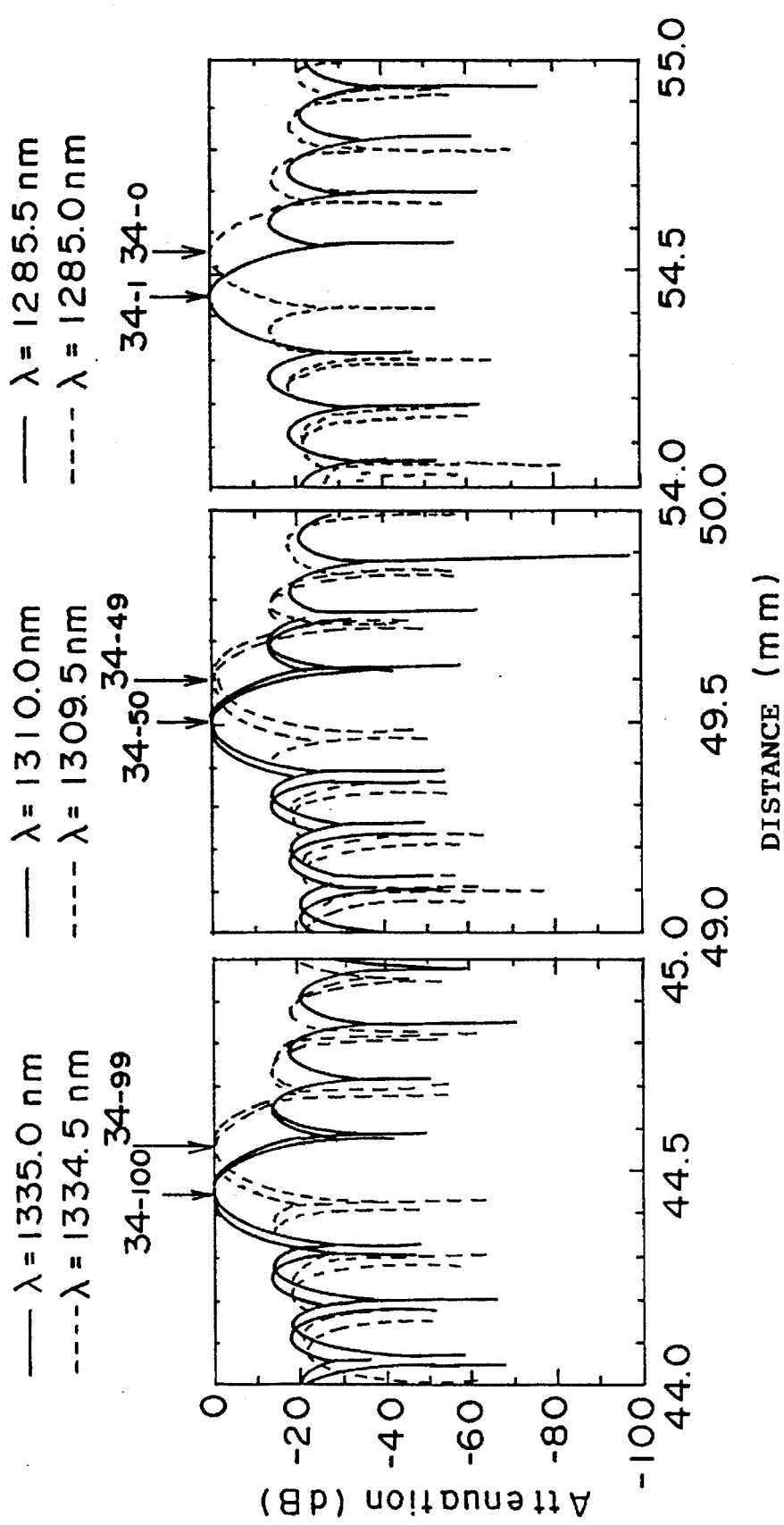
FIGS. 6A–6C are diagrams showing the separation of a wavelength-multiplex optical signal into respective optical signal components.

FIGS. 6A–6C show an example of detecting the optical signal components from the wavelength-multiplex optical signals emitted from the laser diodes $33_0$, $33_{50}$ and $33_{100}$ by means of the laser diodes on the edge surface $31a$, wherein FIG. 6A shows the case in which an optical signal component having a wavelength of 1335.0 nm (shown by a continuous line) and an optical signal component having a wavelength of 1334.5 nm (shown by a broken line) are detected by the photodiode $34_{100}$ and the photodiode $34_{99}$, while FIG. 6B shows the case in which an optical signal component having a wavelength of 1310.0 nm (shown by a continuous line) and an optical signal component having a wavelength of 1309.5 nm (shown by a broken line) are detected by the photodiodes $34_{50}$ and $34_{49}$. Further, FIG. 6C shows the case wherein an optical signal component having a wavelength of 1285.5 nm (represented by a continuous line) and an optical signal component having a wavelength of 1285.0 nm (represented by a broken line) are detected by the photodiodes $34_1$ and $34_0$.

Referring to FIG. 6A, the continuous line represents the wavelength-dispersion characteristics of the optical signal component having the wavelength of 1335.0 nm while the broken line represents the wavelength-dispersion characteristics of the optical signal component having the wavelength of 1224.5 nm, wherein it will be noted that each of the continuous line and the broken line has a range or band corresponding to the error in the incidence angle of the optical signal components to the photodiodes $34_{100}$ and $34_{99}$. Such an error arises due to the error in the positions $y_0$, $y_{50}$ or $y_{100}$ of the laser diode $33_0$, $33_{50}$ or $33_{100}$. More specifically, such an error occurs as a result of rounding of the grating pitch $\underline{\Lambda}$ and the position x of the diffraction grating respectively at the precision of 0.1 nm and 0.1 mm and can be minimized by optimizing the diameter of the photodiode used for detection or by integrating the photodiode and the microlens. A similar band is observed also in FIG. 6B and FIG. 6C.

As indicated in FIGS. 6A–6C, each of the photodiodes are disposed at a position that minimizes the intensity of the optical signal component of the adjacent channel. For example, the photodiode $34_{100}$ is disposed in FIG. 6A at a position in which the intensity of the optical signal component having a wavelength of 1334.5 nm and corresponding to the adjacent photodiode $34_{99}$, becomes minimum. Similarly, the photodiode $34_{99}$ is formed at a position in which the intensity of the optical signal component having the wavelength of 1335.0 nm and hence corresponding to the photodiode $34_{100}$, becomes minimum. A similar relationship holds also between the photodiodes $34_{50}$ and $34_{49}$ of FIG. 6B as well as between the photodiodes $34_1$ and $34_0$ of FIG. 6C. By optimizing the position of the photodiodes $34_0$–$34_{100}$ as such, it is possible to minimize the cross-talk between different wavelength channels. On the other hand, the relationship of FIGS. 6A–6C indicates also that suppression of the cross-talk beyond the foregoing ratio of about 20 dB is difficult even when the position of the photodiodes is optimized ideally. In other words, the construction of the optical switching device that uses the diffraction grating of FIG. 3 alone cannot suppress the cross-talk at the photodiodes $34_0$–$34_{100}$ beyond 20 dB.

Figure 7:
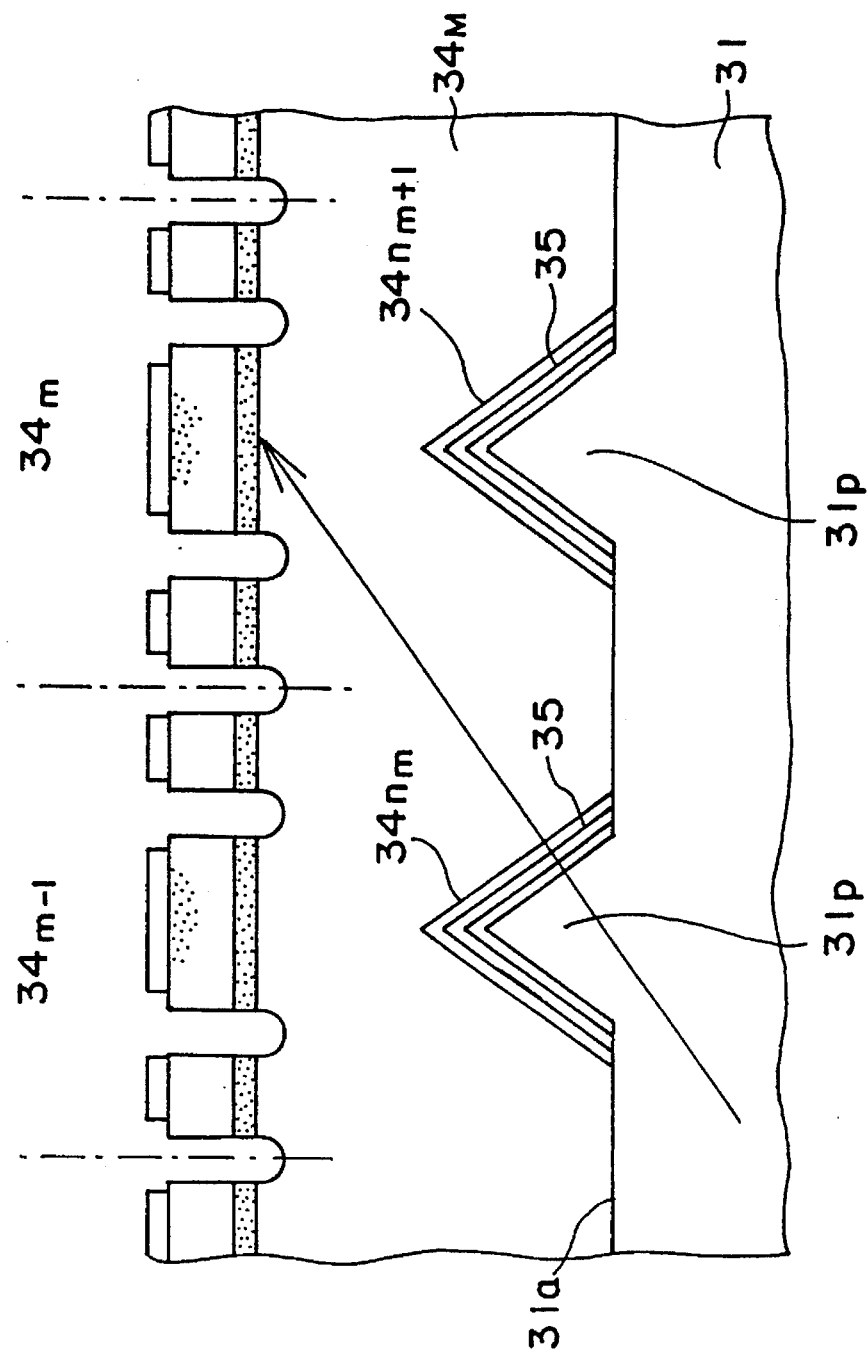
FIG. 7 is a diagram showing the essential part of the optical switching device according to a second embodiment of the present invention.

FIG. 7 shows the construction of the optical switching device according to a second embodiment wherein the suppression of cross-talk is improved, wherein it should be noted that FIG. 7 indicates only the essential part of the embodiment.

Referring to FIG. 7, it will be noted that triangular projections $31p$ are provided on the edge surface $31a$ of the slab 31 in correspondence to the photodiodes $34_0$–$34_{100}$, wherein the photodiodes $34_0$–$34_{100}$ are provided on a substrate 34M that carries triangular depressions $34n_0$–$34n_{100}$ in correspondence to the triangular projections $31p$ such that each of the triangular depressions $34n_0$–$34n_{100}$ mates with a corresponding triangular projection $31p$. In the illustrated example, it should be noted that the depression $34n_m$ corresponds to the photodiode $34_m$ and the depression $34n_{m+1}$ corresponds to the photodiode $34_{m+1}$. Thereby, it should be noted that each of the depressions $34n_1$–$34n_m$ includes an oblique edge that intersects perpendicularly with the ray path of the optical signal component incident to the corresponding photodiode $34_0$–$34_{100}$, and a multilayer film 35 forming a λ/4 filter is deposited on such an oblique surface.

Figure 8:
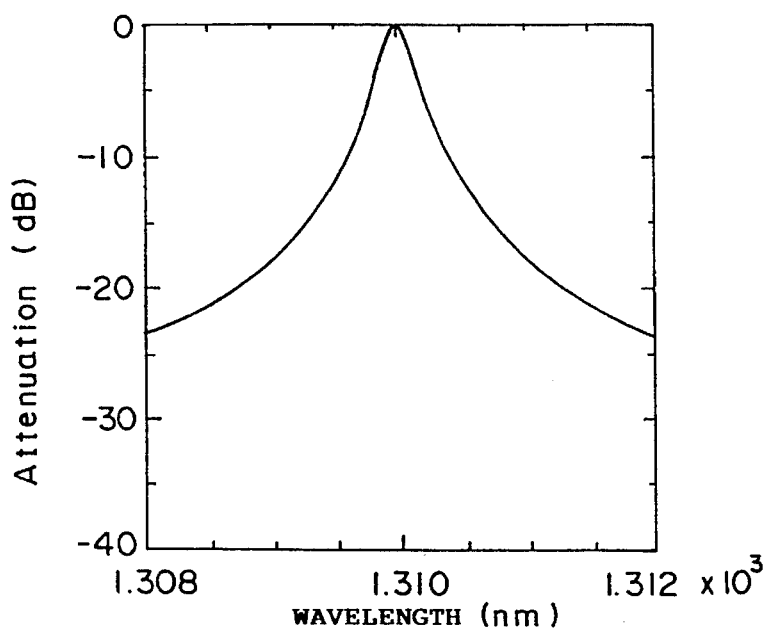
FIG. 8 is a diagram showing the transmittance of an optical filter used in the embodiment of FIG. 7.

FIG. 8 shows the transmittance of the λ/4 filter formed of the multilayer film 35. It will be noted from FIG. 8 that such a λ/4 filter induces an attenuation exceeding 10 dB when the wavelength of the incident optical signal deviates from the central wavelength of the filter by 5 nm.

Figure 9:
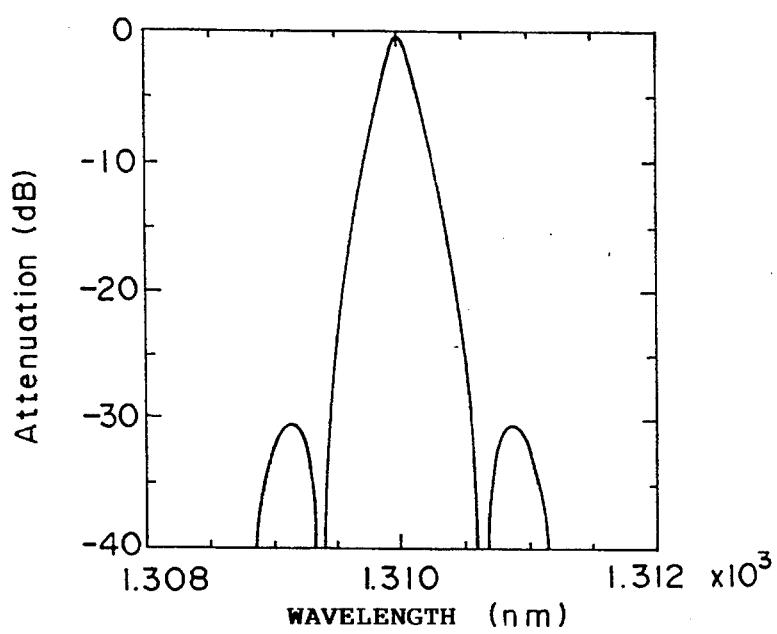
FIG. 9 is a diagram showing the wavelength-dispersion in the optical switching device of FIG. 7 on which the optical filter having the characteristics of FIG. 8 is provided.

FIG. 9 shows the wavelength-dispersion characteristics of the optical signal at the photodetector for the case where the λ/4 filter is provided on the optical switching device as indicated in FIG. 7. As will be noted from FIG. 9, an attenuation exceeding 30 dB is attained when the wavelength of the incident optical beam has deviated from the central wavelength of the filter by 5 nm.

Figure 10:
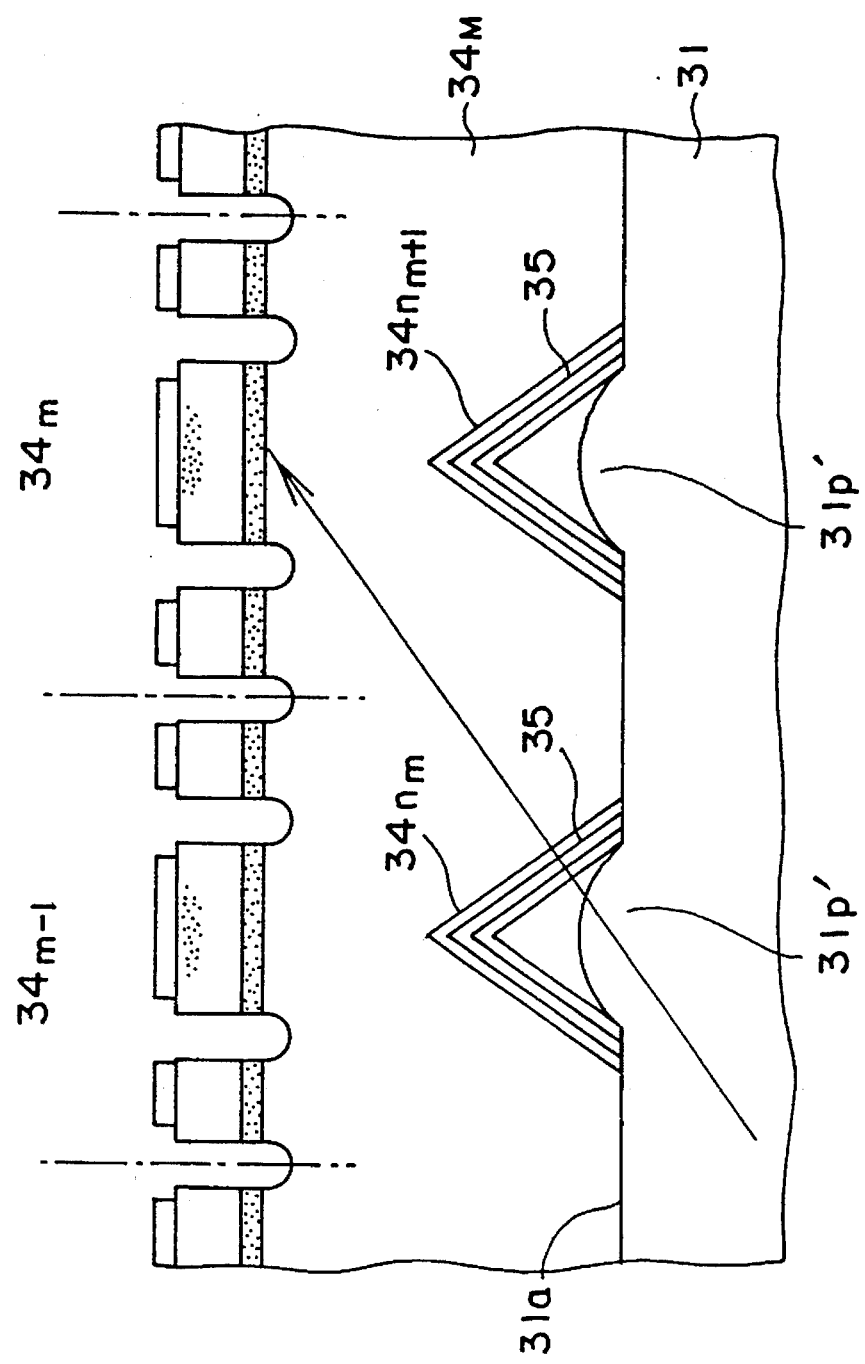
FIG. 10 is a diagram showing a modification of the optical switching device of FIG. 7.

Further, it is possible to provide microlenses $31p'$ in place of the triangular projections $31p$ as indicated in FIG. 10. By providing such microlenses, it is possible to compensate for the variation of the incidence angle of the optical signal components to the corresponding photodiodes, which may change from 13° to 15.5° depending upon the position of the diffraction grating.

Figure 11:
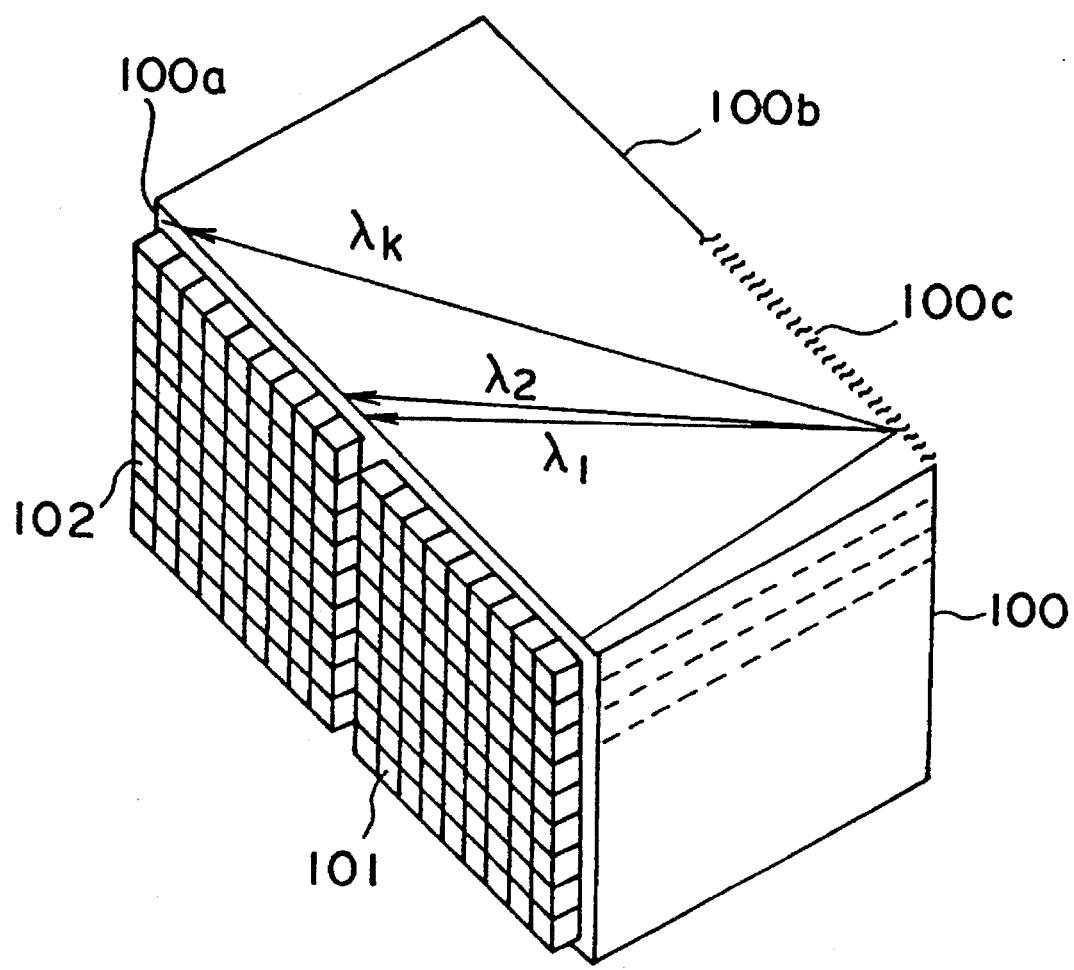
FIG. 11 is a diagram showing the construction of a multiple bit optical switching device according to a third embodiment of the present invention.

It should be noted that it is possible to process a number of bits simultaneously by stacking the optical switching device of FIG. 5 according to the number of bits of the data to be switched. FIG. 11 shows a third embodiment of the present invention for such a multiple-bit switching.

Referring to FIG. 11, the slabs 31 of FIG. 3 are stacked in number to form a single optical waveguide block 100. Alternatively, one may form the waveguide block 100 from a single transparent block of glass or plastic. The block 100 has an edge surface 100a corresponding to the foregoing edge surface $31a$ of the optical waveguide 31 on which a two-dimensional array of laser diodes is provided. Such a two-dimensional array is constructed on a semiconductor chip 101 that carries a number of one-dimensional laser diode arrays each including the laser diodes $33_0$–$33_{100}$, wherein the semiconductor chip 101 is bonded upon the foregoing edge surface 100a by means of adhesives. Further, a diffraction grating 100c corresponding to the foregoing diffraction grating 32 is provided on another edge surface 100b that faces the foregoing edge surface 100a. Thereby, the construction identical to that of FIG. 3 is repeated in each layer and the separation of the incoming wavelength-multiplex signal into respective optical signal components is carried out in each of the layers. By forming such layers in number corresponding to the number of the bits of multiple bid data to be processed, it is possible to switch each bit of the multiple bit data simultaneously. When forming the block 100 as a single transparent block, the block 100 is divided into a plurality of hypothetical layers each corresponding to a bit of the multiple bit data, In such a case, the separation of the wavelength-multiplex optical signal into respective optical signal components is achieved in each of such hypothetical layers.

Figure 12:
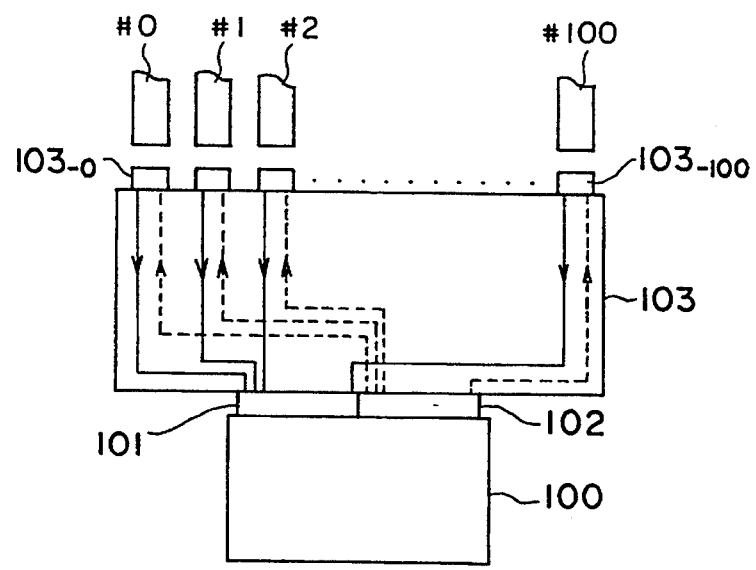
FIG. 12 is a diagram showing an example of an optical switching system that uses the optical switching device of FIG. 11.

FIG. 12 shows an example of using the multiple bit optical switching device of FIG. 11 for the switching of data between a plurality of terminals #0–#100. Here, it should be noted that the terminals #0–#100 are not necessarily limited to ordinary digital telecommunication terminals but also may be a circuit board of a parallel processing computer that carries thereon processors that receive and output the foregoing multiple bit data. Referring to FIG. 12, the semiconductor chip 101 carrying thereon the laser diode array as well as the semiconductor chip 102 carrying thereon the photodiode array are held on a wiring unit 103, while the wiring unit 103 carries thereon input/output ports $103_0$–$103_{100}$ that are connected to the foregoing terminals #0–#100. Thereby, the optical switching device form a telecommunication system or bus of a computer.

Figure 13:
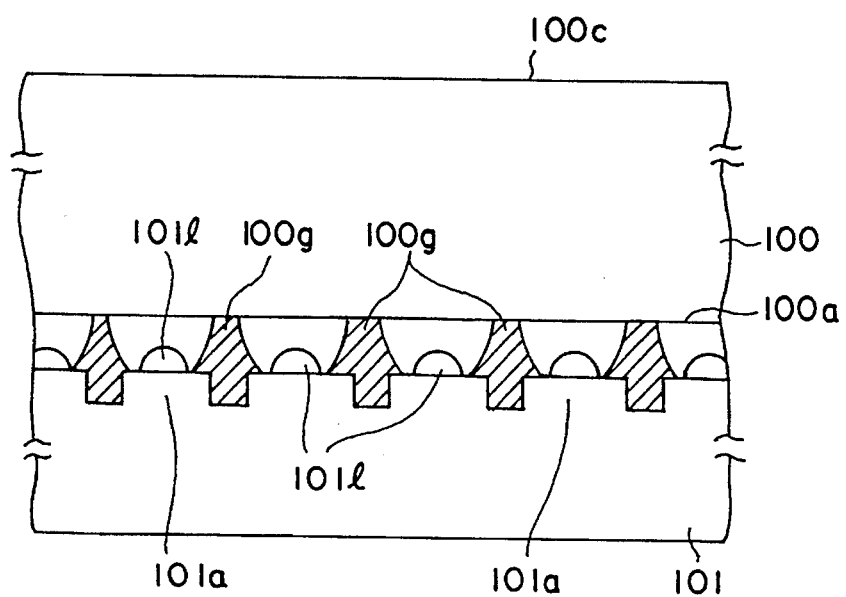
FIG. 13 is a diagram showing a modification of the optical switching device of FIG. 11.

In the multiple bit optical switching device of FIG. 11 that uses a transparent block 100, it is preferable to provide a microlens $101_1$ in correspondence to each of the laser diode forming the two-dimensional layer diode array 101a as indicated in FIG. 13. By doing so, it is possible to eliminate the optical beam emitted from the laser diode from causing a diffusion and entering to adjacent layer. The chip 101 carrying such microlenses is bonded upon the block 100 by means of an adhesive layer 100g. The problem of cross-talk in the multiple bit data is thereby suppressed successfully.

Figure 14A:
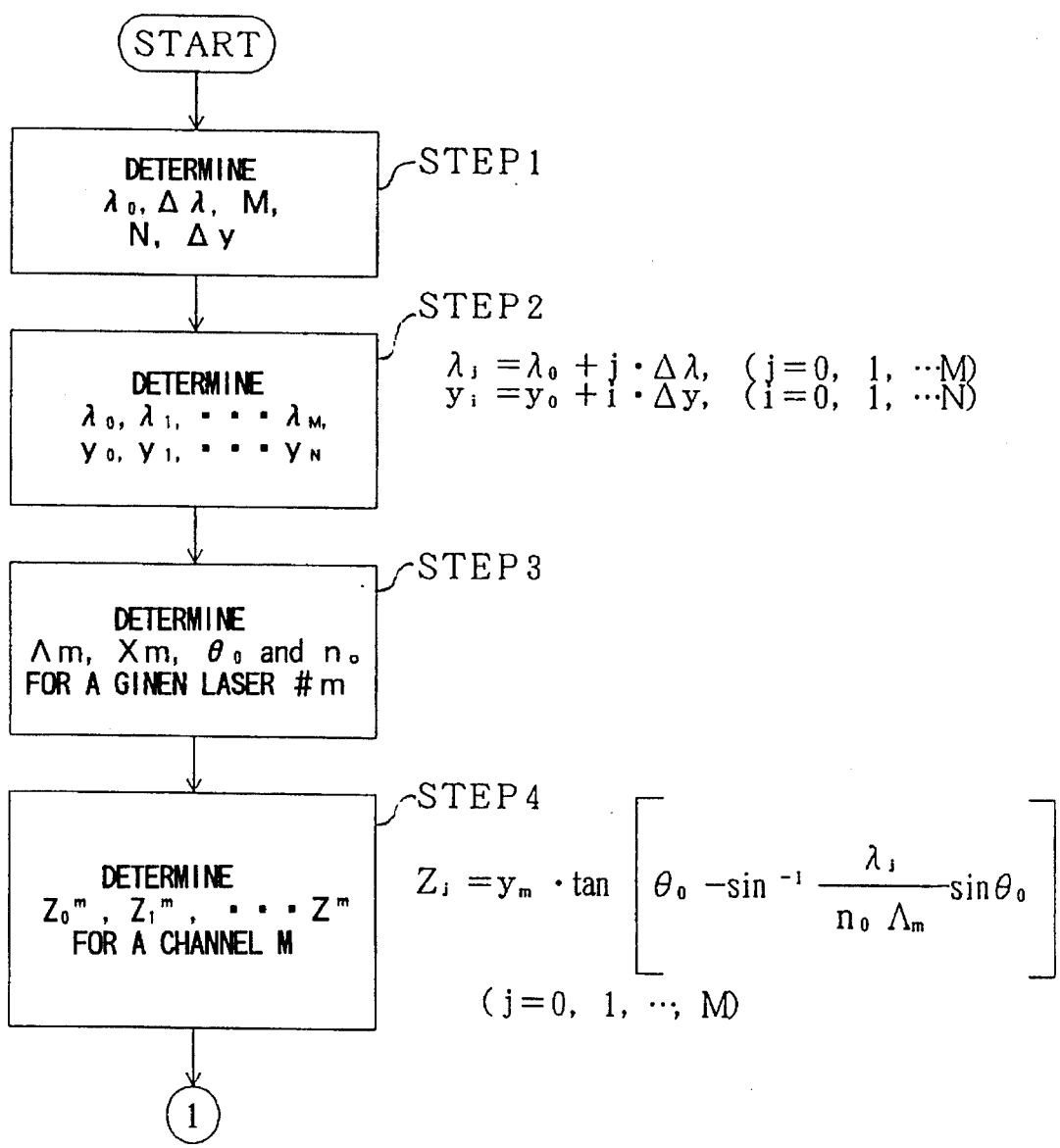
FIGS. 14A and 14B are flowcharts showing the process for optimizing the position of the photodetection elements in the optical switching device with respect to the position and pitch of the diffraction gratings.
Figure 14B:
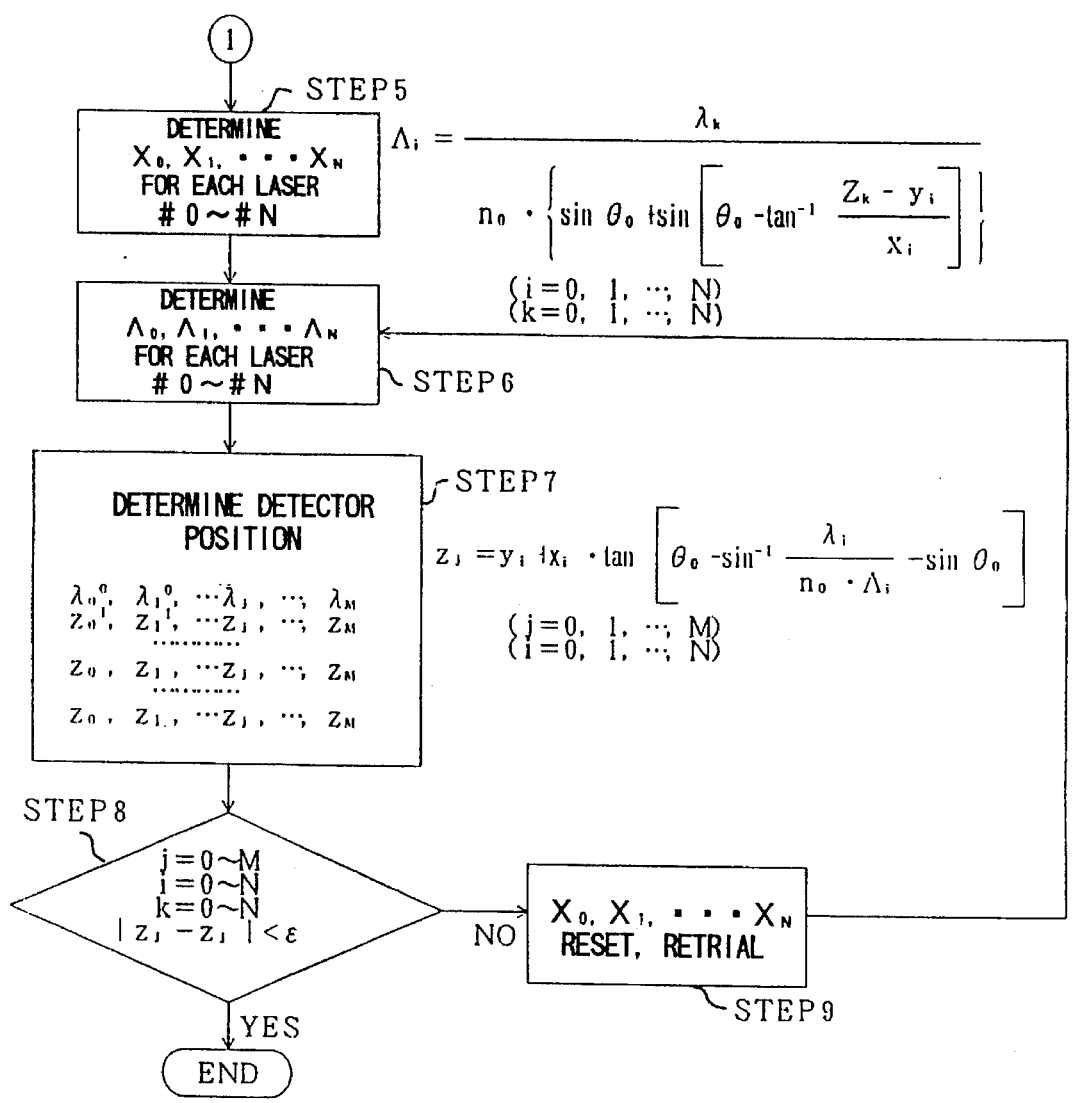

FIGS. 14A and 14B show the flowchart for determining the relationship between the positions $y_0$–$y_{100}$ of the laser diodes $33_0$–$33_{100}$, the positions $z_0$–$z_{100}$ of the photodiodes $34_0$–$34_{100}$, the positions $x_0$–$x_{100}$ of the diffraction gratings $32_0$–$32_{100}$ and the grating pitches $\Lambda_0$–$\Lambda_{100}$.

Referring to FIGS. 14A and 14B, the mutual separation $\Delta y$ is determined for the laser diodes $33_0$–$33_{100}$ in a step 1 based upon a reference wavelength $\lambda_0$ and the wavelength separation $\Delta\lambda$ and the number of channels M in the wavelength-multiplex signals. The reference wavelength $\lambda_0$ may be thereby set to be the shortest wavelength of the optical signal component that constitutes the wavelength-multiplex optical signal.

Next, in a step 2, the wavelength of each channel is determined, based upon the reference wavelength $\lambda_0$, the wavelength separation $\Delta\lambda$ and the number of the channels M that have been determined in the step 1, according to the equation $$\lambda_j = \lambda_0 + j \cdot \Delta\lambda \ (j=0, 1, \ldots M),$$

wherein the value of M is set to 100 in the example of FIG. 3.

Figure 1:
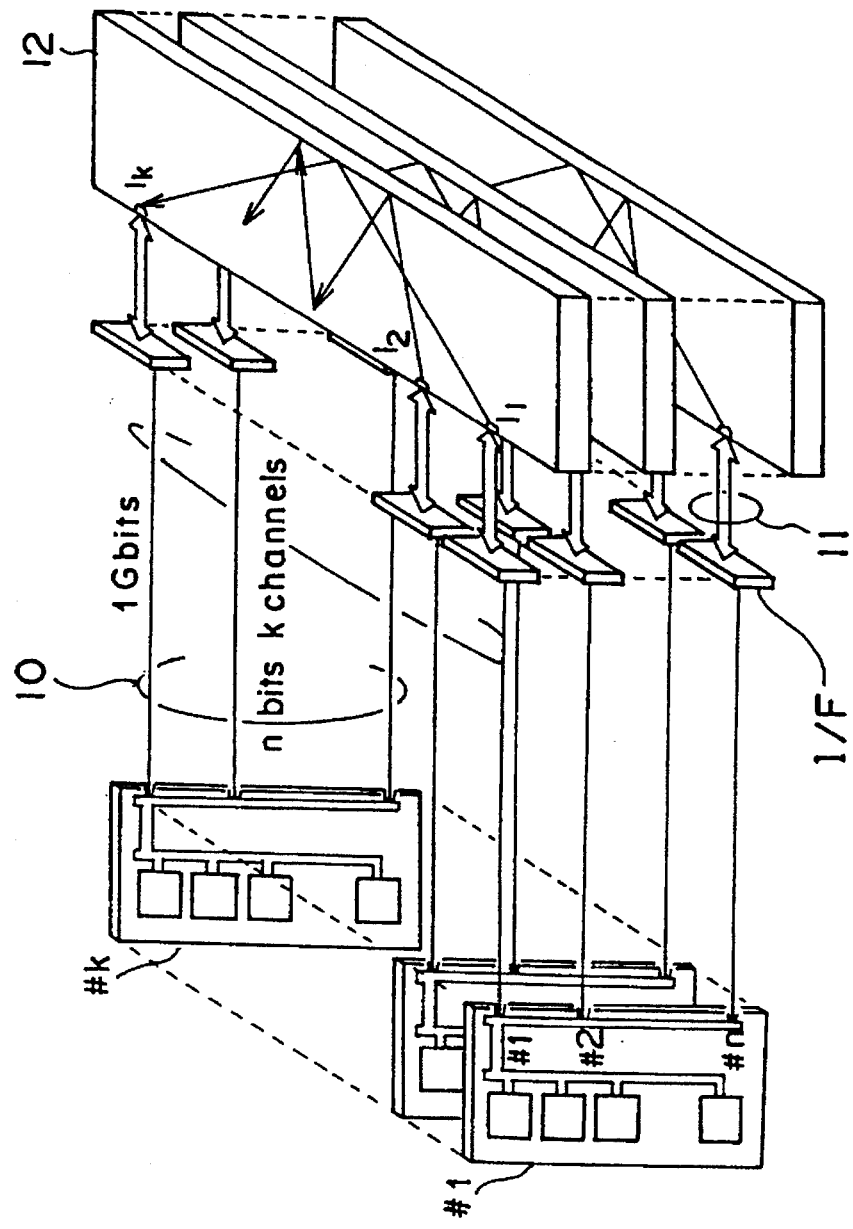
FIG. 1 is a diagram showing the schematical construction of a conventional optical switching device.
Figure 2:
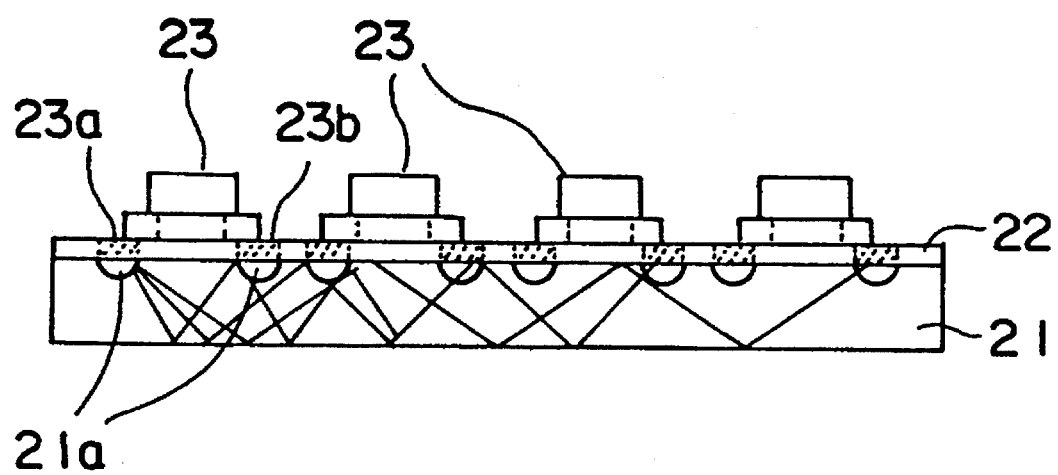
FIG. 2 is a diagram showing the construction of a conventional optical bus of a computer.

Further, the position $y_o$ of the laser diode $33_0$ corresponding to the reference wavelength $\lambda_0$ is determined according to the relationship $$y_i = y_o + i \cdot \Delta y \ (i=0, 1, \ldots N)$$

wherein the value of N is also set to 100 in the example of FIG. 1.

Next, in a step 3, the grating pitch $\Lambda_m$ and the position $x_m$ of the diffraction grating $32_m$ corresponding to an arbitrary laser diode $33_m$, as well as the incidence angle $\Theta_0$ and the refractive index $n_0$ of the slab 31, are determined.

Further, in a step 4, the positions $z_0^m, z_1^m, \ldots z_M^m$ of the photodiodes $34_0$–$34_M$ corresponding to the expected positions of the diffraction beams, are obtained for each of the wavelength components $\lambda_0$–$\lambda_M$ according to the following equation (1).

$$z_j^m = y_m + x_m \times \tan\left[\theta_0 \times \sin^{-1}\left(\frac{\lambda_j}{n_0 \times \Lambda_m} \times \sin\theta_0\right)\right] \quad (1)$$

where j=0, 1, . . . M.

Next, in a step 5, the positions $x_0$–$x_N$ of the diffraction gratings $32_0$–$32_N$ are determined in correspondence to the laser diodes $33_0$–$33_N$, and a step 6 is conducted subsequently for determining the grating pitches $\Lambda_0$–$\Lambda_N$ of the diffraction gratings $32_0$–$32_N$ in correspondence to the laser diodes $33_0$–$33_N$, according to the following equation (2).

$$\Lambda_i = \frac{\lambda_k}{n_0 \times \left\{\sin\theta_0 + \sin\left[\theta_0 - \tan^{-1}\left(\frac{z_k^m - y_i}{x_i}\right)\right]\right\}} \quad (2)$$

where i=0, 1, . . . N, k=0, 1, . . . N.

Further, in a step 7, the diffraction positions $z_0^0, z_1^0, \ldots z_M^0; z_0^1, z_1^1, \ldots z_M^1; z_0^N, z_1^N, \ldots z_M^N$ are obtained for the wavelengths $\lambda_0, \lambda_1, \ldots \lambda_M$ of the optical signal components that are emitted from the laser diodes $33_0$–$33_N$, according to the equation (3).

$$z_j^i = y_i + x_i \times \tan\left[\theta_0 - \sin^{-1}\left(\frac{\lambda_j}{n_0 \times \Lambda_i} - \sin\theta_0\right)\right] \quad (3)$$

where j=0, 1, . . . M, i=0, 1, . . . N.

Further, in a step 8, it is checked if there holds a relationship $$|z_j^i - z_j^k| < \epsilon$$

for each combination of the parameters i, j and k, wherein the parameter i changes in the range from 0 to M, the parameter i changes in the range from 0 to N, and the parameter k changes in the range from 0 to N. The parameter $\epsilon$ indicates a tolerance and is set to 0.1 mm in the foregoing examples of FIGS. 6A–6C. When the foregoing inequality is satisfied, the optical signal components having the same wavelength $\lambda_i$ reach the same point $z_j$ as a result of diffraction by the diffraction gratings $32_0$–$32_N$.

In the event that the foregoing inequality is not satisfied in the step 8, a step 9 is conducted for resetting the parameters of the diffraction gratings $32_0$–$32_N$, and the foregoing steps 6–8 are carried out repeatedly until the relationship of the equation (4) is satisfied.

Next, a fourth embodiment of the present invention will be described with reference to FIG. 14, wherein those parts described already with reference to preceding drawings are designated by the same reference numerals and the description thereof will be omitted.

In the present embodiment, the slab 31 that constitutes the optical waveguide is formed with a single oblique surface 31d such that the surface 31d intersects with each ray path of the wavelength-multiplex optical signals emitted from the laser diodes $33_0$–$33_{100}$ with an angle of 45°. Further, the oblique surface 31d carries thereon diffraction gratings $32_0$–$32_{100}$ in correspondence to the laser diodes $33_0$–$33_{100}$. In such a construction, it is no longer necessary to provide sawtooth regions 31c on the edge surface 31b of the slab 31, and the construction of the optical switching device is simplified substantially.

In the device of the present embodiment, too, the optical beam emitted from any of the laser diodes $33_0$–$33_{100}$ as a wavelength-multiplex optical signals is diffracted by a corresponding diffraction grating included in the diffraction gratings $31_0$–$31_{100}$ and hits a corresponding photodiode provided in correspondence to a wavelength channel of the wavelength-multiplex optical signal such as the photodiode $34_{50}$. The following TABLE II shows an example of the relationship between the positions $y_0$–$y_{100}$ and $z_0$–$z_{100}$ of the laser diodes $33_0$–$33_{100}$ and the photodiodes $34_0$–$34_{100}$ as well as the positions $x_0$–$x_{100}$ and the grating pitches $\Delta_0$–$\Delta_{100}$ of the diffraction gratings $32_0$–$32_{100}$, wherein these parameters $x_0$–$x_{100}$, $y_0$–$y_{100}$, $z_0$–$z_{100}$ and $\Delta_0$–$\Delta_{100}$ are determined by the processes shown in FIGS. 14A and 14B.

TABLE II

| LD#y(mm) | x(mm) | Δ(nm) | PD# | z(mm) |
|---|---|---|---|---|
| #00.0 | 147.97 | 1744.78 | #0 | 244.027 |
| . | . | . | . | . |
| . | . | . | . | . |
| . | . | . | . | . |
| #292.9 | 151.12 | 1692.98 | #29 | 241.058 |
| #303.0 | 151.22 | 1691.33 | #30 | 240.956 |
| . | . | . | . | . |
| . | . | . | . | . |
| . | . | . | . | . |
| #505.0 | 153.10 | 1660.00 | #50 | 238.942 |
| . | . | . | . | . |
| . | . | . | . | . |
| . | . | . | . | . |
| #10010.0 | 157.96 | 1584.33 | #100 | 234.017 |

Figure 15:
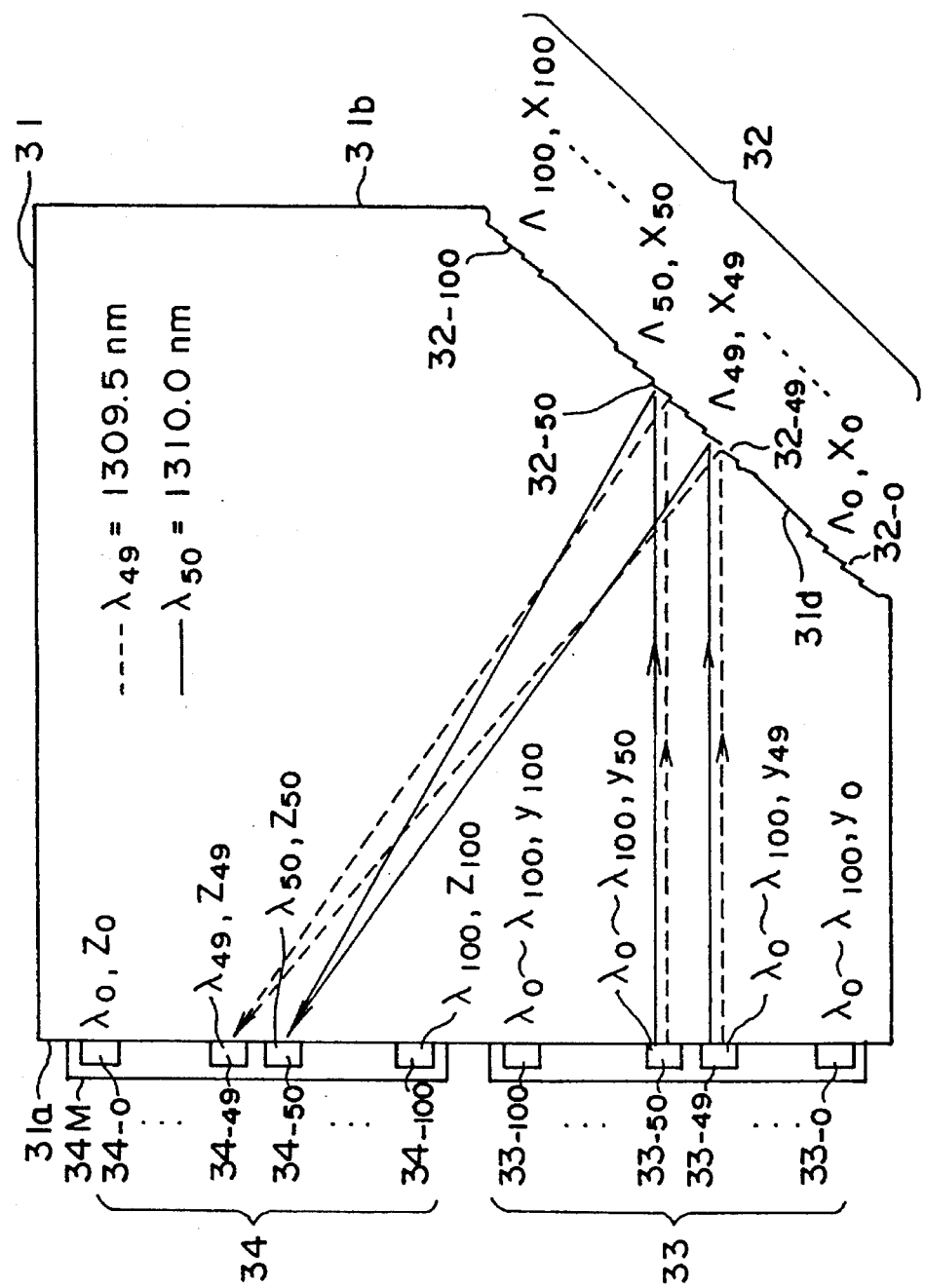
FIG. 15 is a diagram showing the construction of an optical switching device according to a fourth embodiment of the present invention.
Figure 16:
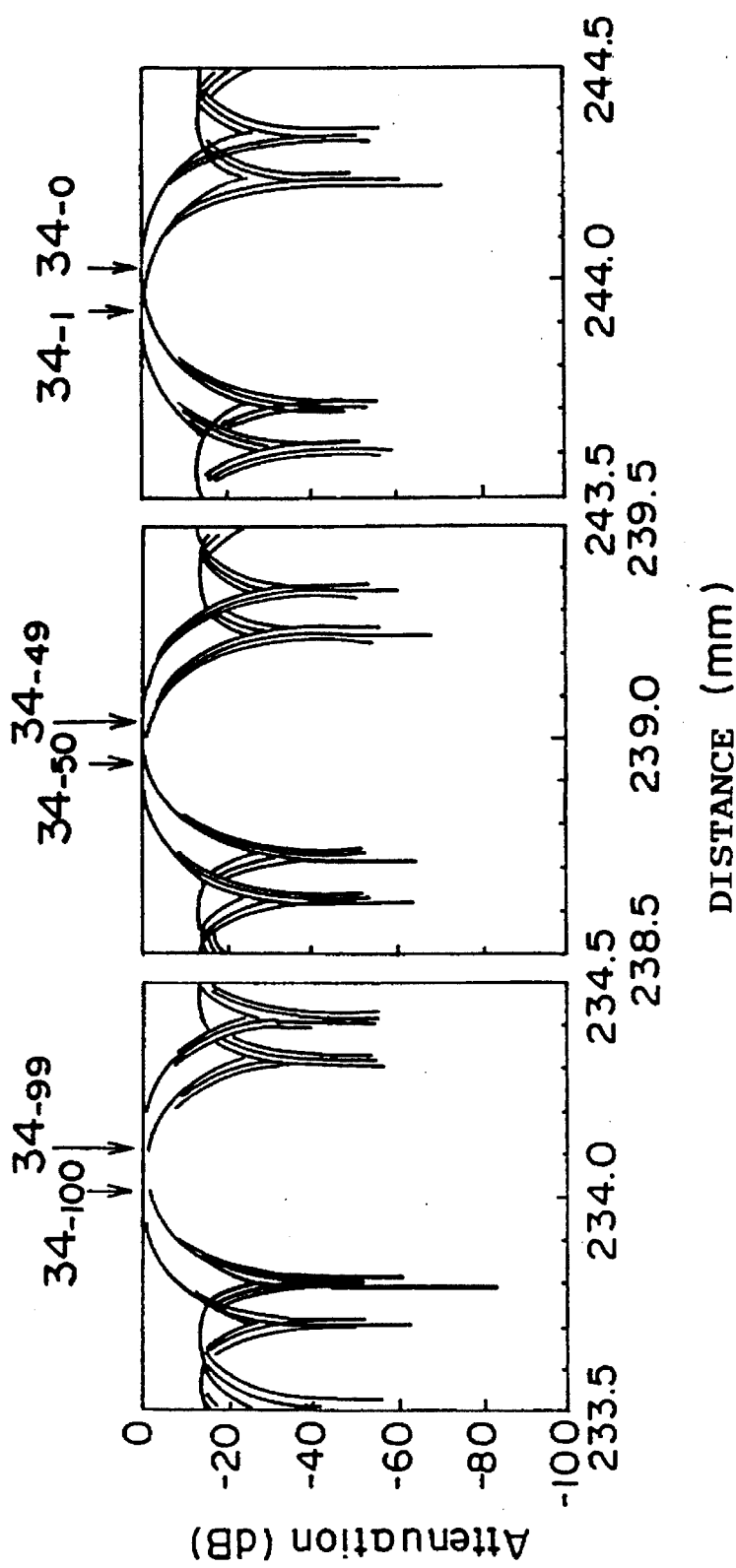
FIGS. 16A–16C are diagrams showing the wavelength-dispersion of the optical switching device of FIG. 15.

FIGS. 16A–16C show the wavelength-dispersion of the optical switching device of FIG. 15. Similarly to the case of FIGS. 6A–6C, FIG. 16A shows the case for detecting the optical signal component having a wavelength of 1335.0 nm and the optical signal component having a wavelength of 1334.5 nm by means of the photodiode $34_{100}$ and $34_{99}$ respectively, while FIG. 16B shows the case for detecting the optical signal component having a wavelength of 1310.0 nm and the optical signal component having a wavelength of 1309.5 nm by means of the photodiode $34_{50}$ and $34_{49}$ respectively. Further, FIG. 16C shows the case for detecting the optical signal component having a wavelength of 1285.5 nm and the optical signal component having a wavelength of 1285.0 nm by means of the photodiode $34_1$ and $34_0$ respectively.

As will be apparent from FIGS. 16A–16C, the photodiodes each provided in correspondence to a particular wavelength are not in the position corresponding to the minimum of the optical signal components of adjacent channels. Thus, the optical switching device of FIG. 15 has a drawback in that the suppression of cross-talk between adjacent channels tends to be insufficient. The reason of this undesirable effect is attributed to the increased grating pitch of the diffraction gratings formed on the surface $31d$ as compared with the case of FIG. 3. Thus, the optical switching device of the present embodiment employs the λ/4 filter 35 described with reference to FIG. 7 or FIG. 10 for each of the photodiodes in order to improve the suppression of cross-talk.

Figure 17:
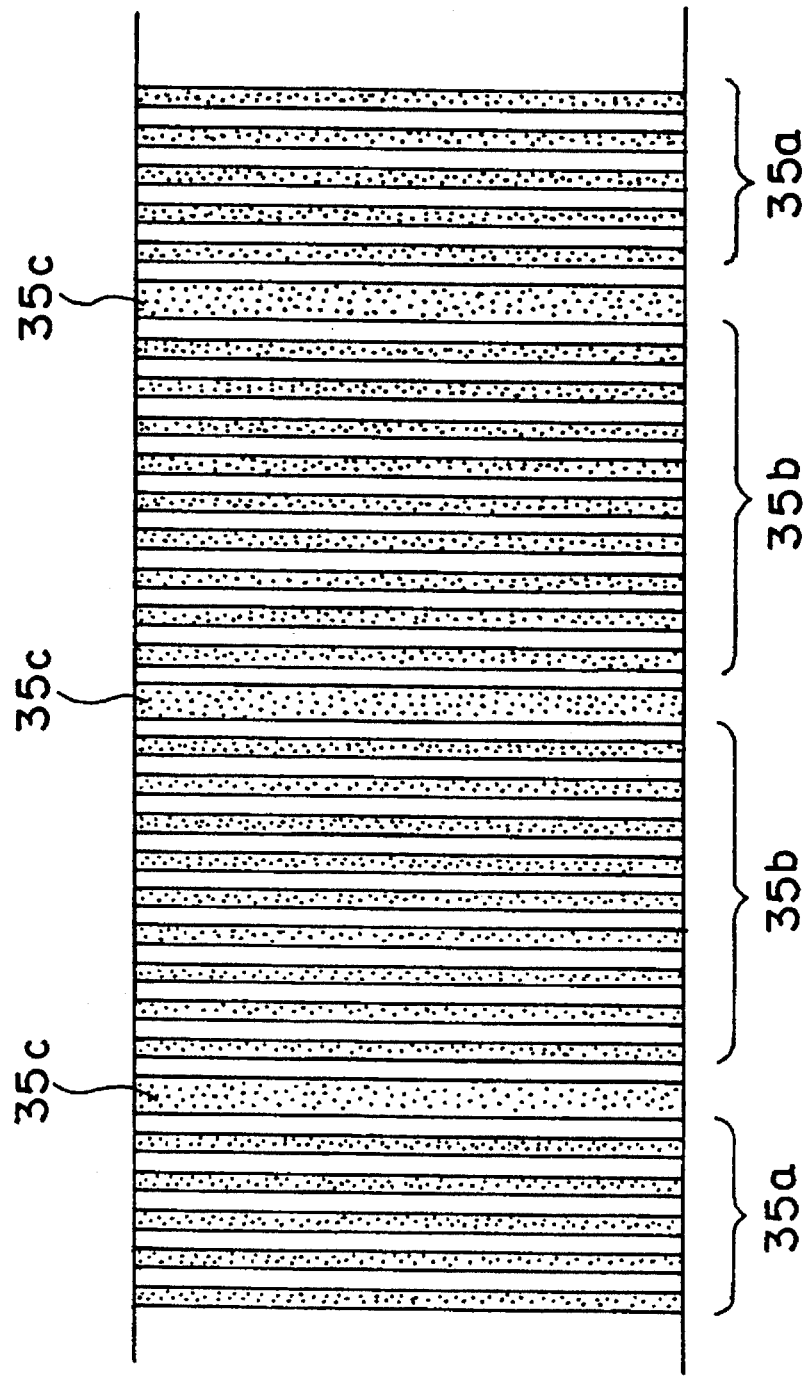
FIG. 17 is a diagram showing the construction of a multilayer dielectric filter used in the optical switching device of FIG. 15.

FIG. 17 shows the construction of the foregoing λ/4 filter for use in the optical switching device of the present embodiment. It should be noted that the filter of FIG. 17 can be used also in the optical switching device of FIG. 3.

Referring to FIG. 17, the λ/4 filter includes a first interference region 35a in which a first dielectric film and a second dielectric film are stacked alternately n times with respective thicknesses set to one-forth the wavelength of the incident optical beam, wherein a second interference region 35b formed of an alternate repetition of the foregoing first dielectric film and the second dielectric film for 2 n times is provided on the first interference region 35a, with an intervening dielectric film 35c having a thickness corresponding to one-half the wavelength of the incident optical beam interposed between the region 35a and the region 35b. Further, the regions 35a and 35b are repeated a number of times with the dielectric film 35c intervening therebetween.

Figure 18:
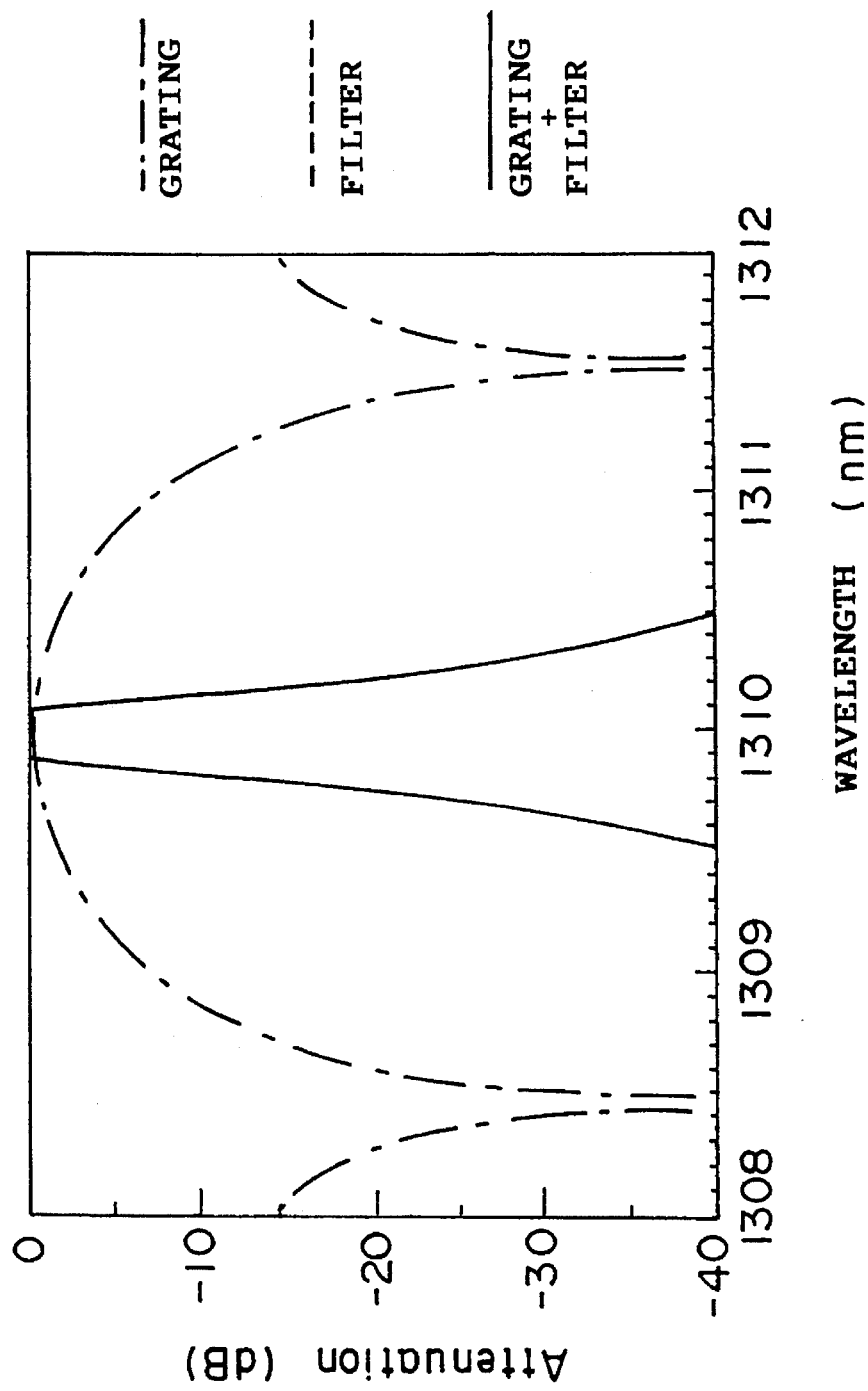
FIG. 18 is a diagram showing the wavelength-dispersion of the optical switching device of FIG. 15 for the case in which the multilayer dielectric filter of FIG. 17 is provided thereon.

FIG. 18 shows the transmission characteristics of the filter 35. Referring to FIG. 18, it will be noted that the filter shows a flat transmittance at the central wavelength for a range or band of several nanometers as indicated by a broken line, wherein the transmittance of the filter drops sharply when the wavelength of the incident optical beam falls outside such a central band. Thus, by combining the wavelength-dispersion of the optical switching device of FIG. 15 shown in FIG. 18 by one-dotted chain, it is possible to obtain the wavelength-dispersion characteristics shown in FIG. 18 by a continuous line. By using such a construction, it is possible to suppress the cross-talk between adjacent channels by more than 30 dB. Further, the optical switching device having such the characteristics of FIG. 18, has an advantageous feature of tolerating minute deviation in the incidence angle of the optical signals to corresponding photodiodes.

Further, the present invention is not limited to the embodiments described heretofore, but various variations and modifications may be made without departing from the scope of the invention.

What is claimed is:

1. An optical switching device having a plurality of input ports for receiving a plurality of wavelength-multiplex optical signals, said optical switching device separating each of said plurality of wavelength-multiplex optical signals into a plurality of optical signal components each having a wavelength corresponding to a channel of the wavelength-multiplex signals, such that each of said plurality of optical signal components is directed to a corresponding one of a plurality of output ports provided in correspondence to the wavelengths of the optical signal components forming said wavelength-multiplex signals, said optical switching device comprising:

an optical waveguide formed of an optically transparent medium;

a plurality of light emitting elements provided on said optical waveguide as said plurality of input ports, each of said light emitting elements producing a wavelength multiplex optical signal that includes therein a plurality of optical signal components having respective, mutually different wavelengths and injecting said wavelength-multiplex optical signal into said optical waveguide along a ray path that is pertinent to said wavelength-multiplex optical signal;

a plurality of photodetection elements provided on said optical waveguide at respective positions that are offset from said plurality of light emitting elements as said output ports, said positions of said photodetection elements corresponding to the wavelengths of said optical signal components forming said wavelength-multiplex optical signals, each of said photodetection elements detecting a signal component that propagates through said optical waveguide and has a wavelength corresponding to the position of said photodetection element; and a plurality of diffraction gratings each provided on said optical waveguide in correspondence to a ray path of a light emitting element included in said plurality of light emitting elements, for separating a wavelength-multiplex signal incident thereto along said ray path, into a plurality of optical signal components constituting said wavelength-multiplex signal, said diffraction grating causing a diffraction of said plurality of optical signal components thus separated to respective, corresponding photodetection elements that are included in said plurality of photodetection elements;
wherein each of said plurality of diffraction gratings has a position on said optical waveguide and a grating pitch, such that said position and grating pitch are different from those of other diffraction gratings.

2. An optical switching device as claimed in claim 1, wherein each of said plurality of photodetection elements is provided on said optical waveguide at a position determined such that a plurality of optical signal components each having a wavelength corresponding to said photodetection element, arrive at said photodetection element after experiencing diffraction at said plurality of diffraction gratings.

3. An optical switching device as claimed in claim 1, wherein each of said photodetection elements is provided on said optical waveguide at a position determined such that an optical signal component, diffracted at one of said plurality of diffraction gratings and having a wavelength corresponding to a photodetection element that is adjacent to said photodetection element, has a minimum intensity.

4. An optical switching device as claimed in claim 1, wherein each of said plurality of diffraction gratings has a grating pitch set such that optical signal components included in said plurality of optical signal components and having a common wavelength, are diffracted to one of said plurality of photodetection elements that corresponds to said common wavelength.

5. An optical switching device as claimed in claim 1, wherein each of said plurality of diffraction gratings is provided on said optical waveguide at a position set such that wavelength-multiplex signals that are included in said plurality of wavelength-multiplex signals and incident to said diffraction grating from light emitting elements included in said plurality of light emitting elements but different from the light emitting element corresponding to said diffraction grating, have an incidence angle different from an incidence angle of said wavelength-multiplex signal that corresponds to said diffraction grating.

6. An optical switching device as claimed in claim 1, wherein each of said plurality of diffraction gratings is formed on a corresponding sloped surface that intersects obliquely to a ray path of a wavelength-multiplex signal that is included in said plurality of wavelength-multiplex signals and corresponds to said diffraction grating.

7. An optical switching device as claimed in claim 6, wherein said plurality of light emitting elements are provided on a first edge surface that defines said optical waveguide, wherein said sloped surfaces are provided on a second, opposing edge surface of said optical waveguide, with a pitch corresponding to a pitch of said light emitting elements on said first edge surface, said plurality of sloped surfaces thereby forming a sawtooth.

8. An optical switching device as claimed in claim 1, wherein said optical waveguide has a common, single sloped surface that intersects obliquely to a ray path of said wavelength-multiplex optical signals that are emitted from respective light emitting elements, wherein said plurality of diffraction gratings are formed on said single common sloped surface in correspondence to said plurality of light emitting elements.

9. An optical switching device as claimed in claim 1, wherein said light emitting elements and said photodetection elements are provides on a common surface of said optical waveguide.

10. An optical switching device as claimed in claim 1, wherein said plurality of light emitting elements are formed on a semiconductor substrate with a predetermined mutual separation, and wherein said semiconductor substrate is adhered upon said optical waveguide.

11. An optical switching device as claimed in claim 1, wherein said plurality of photodetection elements are formed on a semiconductor substrate with a predetermined mutual separation, and wherein said semiconductor substrate is adhered upon said optical waveguide.

12. An optical switching device as claimed in claim 1, wherein each of said plurality of light emitting elements has a corresponding lens for focusing an optical beam emitted from said light emitting element as said wavelength-multiplex optical signal.

13. An optical switching device as claimed in claim 1, wherein said optical waveguide carries a filter in correspondence to each of said plurality of photodetection elements, such that said filter selectively passes a light beam having a wavelength corresponding to the wavelength of said photodetection element on which said filter is provided.

14. An optical switching device as claimed in claim 13, wherein said optical waveguide carries a plurality of notches on an edge surface on which said plurality of photodetection elements are provided such that each of said notches corresponds to the ray paths of the optical signal components incident to said photodetection element corresponding to said notch, each of said notches is defined by a surface that intersects substantially perpendicularly to said optical signal components, and wherein said surface carries thereon a layered structure that forms said filter.

15. An optical switching device as claimed in claim 1, wherein said light emitting elements and said photodetection elements are disposed on said optical waveguide to form a plurality of layers such that said diffraction gratings separate said wavelength-multiplex optical signals emitted from said light emitting elements into respective optical signal components in each of said plurality of layers, and wherein said diffraction gratings diffract said optical signal components to corresponding photodetection elements in each of said plurality of layers.

* * * * *